(12) United States Patent
Kuijk

(10) Patent No.: US 7,274,756 B2
(45) Date of Patent: Sep. 25, 2007

(54) DIGITAL SIGNAL RECEIVER OPERATING BEYOND THE -3DB FREQUENCY

(75) Inventor: Maarten Kuijk, Bercham (BE)

(73) Assignee: Vrije Universteit Brussel, Brussels (BE)

( * ) Notice: Subject to any disclaimer, the term of this patent is extended or adjusted under 35 U.S.C. 154(b) by 535 days.

(21) Appl. No.: 10/483,207

(22) PCT Filed: Jul. 17, 2002

(86) PCT No.: PCT/BE02/00124

§ 371 (c)(1),
(2), (4) Date: Jan. 7, 2004

(87) PCT Pub. No.: WO03/009551

PCT Pub. Date: Jan. 30, 2003

(65) Prior Publication Data

US 2004/0208265 A1    Oct. 21, 2004

Related U.S. Application Data

(60) Provisional application No. 60/306,223, filed on Jul. 18, 2001.

(51) Int. Cl.
*H04B 3/00* (2006.01)
(52) U.S. Cl. ........................ 375/340; 375/257
(58) Field of Classification Search ............ 327/335, 327/558; 375/340, 257, 214, 345, 316
See application file for complete search history.

(56) References Cited

U.S. PATENT DOCUMENTS 3,940,709 A * 2/1976 Heaslett ................ 330/107

5,257,286 A    10/1993 Ray
5,394,108 A *  2/1995 Chun et al. ................ 327/335
5,506,542 A *  4/1996 Hamano et al. ............ 327/558

(Continued)

FOREIGN PATENT DOCUMENTS

WO    WO98/20654    5/1998

(Continued)

OTHER PUBLICATIONS

K. Koli et al, "An Integrated Cable Equalizer Circuit for 150Mbit/s data transmission", Helsinki University of Technology, Electronic Circuit Design Laboratory, 1997 IEEE International Symposium on Circuits and Systems.*

(Continued)

*Primary Examiner*—David C. Payne
*Assistant Examiner*—Leon Flores
(74) *Attorney, Agent, or Firm*—Merchant & Gould P.C.

(57) ABSTRACT

A receiver for digital data connects to a preceding signal path and the digital data has a lower to upper data frequency range. The receiver includes a received signal input terminal connected to a higher frequency gain circuit that shows highest transfer amplitude at the upper data frequency within the lower to upper data frequency range where the signal has been attenuated in its higher frequency components in the preceding signal path and providing an amplified signal at an amplified signal output terminal. The receiver further includes a latching circuit with two threshold levels, the latching circuit is connected with an input terminal to the amplified signal output terminal and an output terminal providing a digital output signal.

17 Claims, 8 Drawing Sheets

U.S. PATENT DOCUMENTS 6,046,617 A * 4/2000 Hoeld .......................... 327/206
6,304,615 B1 * 10/2001 Webster ...................... 375/319

FOREIGN PATENT DOCUMENTS

WO     WO98/45955     10/1998

OTHER PUBLICATIONS

Routama et al. "A transmitter and receiver interface circuit including an equalizer and PFLL for 150Mbit/s cable communication". Custom Integrated Circuits Conference May 5, 1997 pp. 315-318.

* cited by examiner

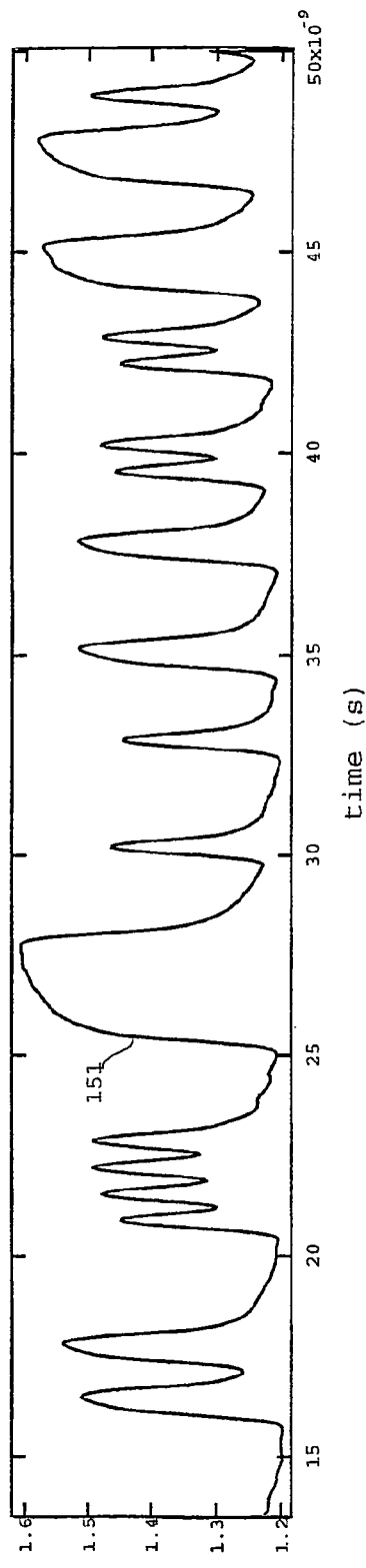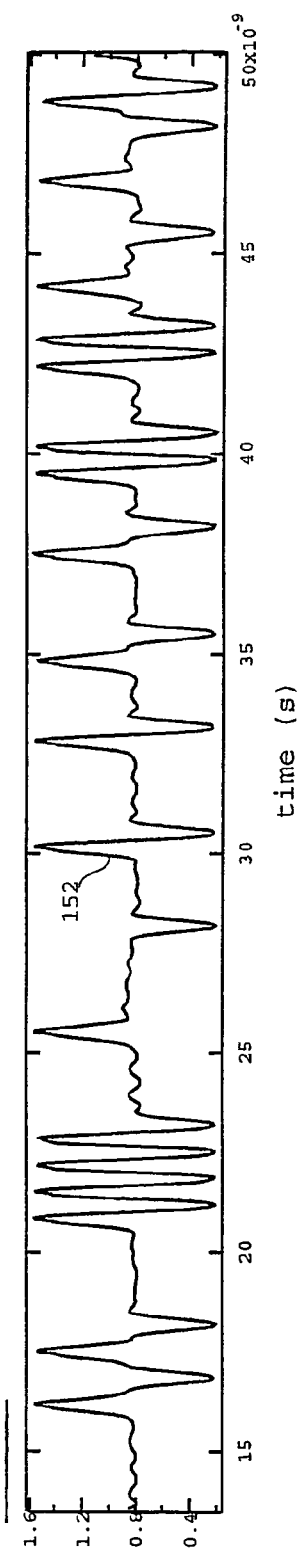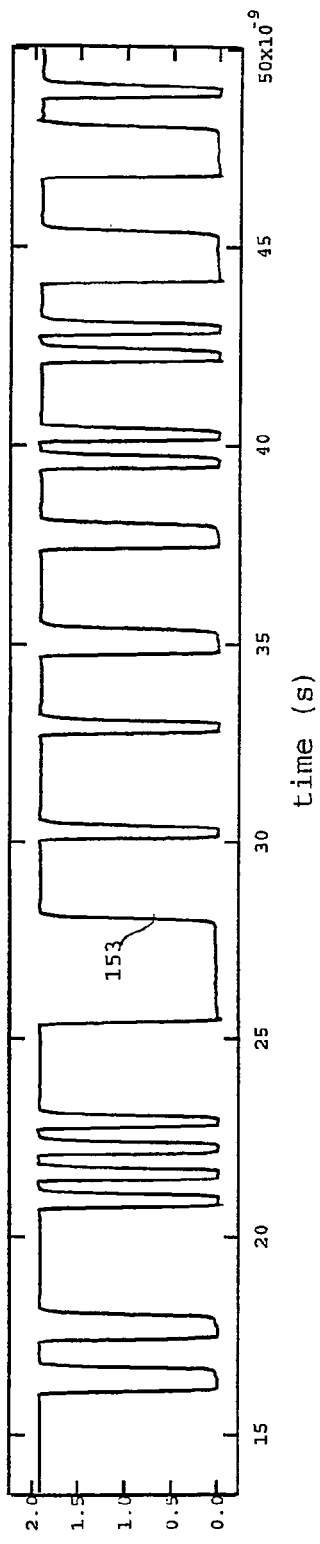

DIGITAL SIGNAL RECEIVER OPERATING BEYOND THE -3DB FREQUENCY

FIELD OF THE INVENTION

The present invention is related to the field of digital receiver circuits, and more in particular to signal restoration of digital data from a signal that has suffered from a limited bandwidth in its preceding path to the receiver.

STATE OF THE ART

One of the goals in the telecom domain is to deliver always-higher bandwidths in order to accommodate higher data-throughput at all levels of the telecom hierarchy. The −3 dB frequency is typically the limiting factor in a digital transmission system. Therefore one typically doesn't choose to operate beyond the −3 dB frequency. However, there are several ways to compensate for the problems of attenuation of higher frequency parts in a signal.

One solution is to give pre-emphasis at the emitter side to the emitted signal. This is a popular approach known by the person skilled in the art. However there are limits on the pre-emphasis amplitude, including the limited operating voltages of line drivers and the limited amount of electromagnetic radiation that one is allowed to generate.

Another known solution is to organise compensation at the receiver-end by equalisation. Hereby the attenuated frequencies undergo extra amplification aiming at a flat transfer function. This method is generally known as equalisation. U.S. Pat. No. 5,793,264 based on this principle teaches how signals from a transmission line are applied by a way of a unity gain path and a frequency selective path including a first wideband amplifier of variable gain to a summing node.

U.S. Pat. No. 5,394,108 aims at receiving burst mode signal data. It teaches how to amplify a digital data stream with front and rear edges using a differentiator stage, an amplifier stage and a hysteresis stage. The differentiator turns edges into pulses, the pulses being indicative for the edges. It regenerates an amplified replica of the input.

Other patents try to make digital receivers that are offset-free and/or give galvanic isolation. U.S. Pat. No. 4,835,486 shows how to make an isolation amplifier with a pair of low capacitance capacitors, starting from a digital input stream. Further, U.S. Pat. No. 6,154,066 shows a receiver circuit for differential signals on a differential line using a couple of capacitors and hence removing DC-offsets.

AIMS OF THE INVENTION

The present invention aims to provide a novel digital signal receiver operating beyond the −3 dB frequency. The present invention also aims at providing a method for recovering a digital data-stream from a signal that may have suffered from one or more causes for bandwidth limitations in the path preceding the receiver.

SUMMARY OF THE INVENTION

The present invention relates to receiver for digital data for connection to a preceding signal path, said digital data having a lower to upper data frequency range, comprising
  A received signal input terminal connected to a higher frequency gain circuit that shows highest transfer amplitude at said upper data frequency within said lower to upper data frequency range where the signal has been attenuated in its higher frequency components in said preceding signal path and providing an amplified signal at an amplified signal output terminal; and
  a latching circuit with two threshold levels, said latching structure being connected with an input terminal to said amplified signal output terminal and an output terminal providing a digital output signal.

In the receiver for digital data of the invention, said latching circuit can comprise a latch and two comparators. Preferably, said latching circuit is a Schmitt trigger. Said higher frequency gain circuit further can show a transfer function with increasing amplitude for increasing frequency in said lower- to upper data frequency range and that starts to decrease in amplitude from a frequency that is higher than said upper data frequency. The receiver for digital data as in any of the claims 1 to 4 wherein the received signal input terminal is arranged to receive a differential signal between two input nodes.

The receiver for digital data of the present invention can be further characterised in that the received signal input terminal comprises one input node arranged to receive the signal. The higher frequency gain circuit can have a transfer function that in amplitude remains equal or decreases for increasing frequencies from said upper data frequency onwards.

The latching circuit preferably has a positive threshold and a negative threshold.

The output of the latching circuit preferably switches from HIGH to LOW when the signal at its input terminal increases above said positive threshold the output switches from LOW to HIGH when the signal at its input terminal decreases below said negative threshold and the swing of said signal at said input terminal is between 1.5 to 5 times larger than the difference between said positive and said negative threshold.

In a preferred embodiment, the receiver according to the present invention further comprises an auto gain circuit that changes an amplification factor in said higher frequency gain circuit in a way that the signal swing at said input of said latching circuit remains substantially at a predefined target value.

A negative feedback loop arranged to bring the average signal at said input terminal of said latching circuit to essentially halfway between said positive and said negative threshold can be added to the design of the receiver according to the present invention. The higher frequency gain circuit can comprise a differentiator stage, and preferably also a gain stage.

The receiver for digital data according to the invention can be further characterised in that when a non-differertial signal is received, the higher frequency gain circuit having a capacitor at its input.

The receiver for digital data as in any of the claims 1 to 13 wherein a differential signal is received, the higher frequency gain circuit having a capacitor connected to each of its two said input nodes.

Also, in the receiver for digital data as in the present invention, the higher frequency gain circuit together with said attenuation in said preceding signal path, shows a slope in the transfer amplitude of +20 dB/decade at said upper data frequency. Said slope can e.g. be present in the frequency range between one eighth of said upper data frequency and said upper data frequency itself.

In an alternative embodiment the present invention concerns a receiver for digital data, comprising
  a differentiating circuit, and
  a latching circuit having an input, an output, a positive threshold and a negative threshold and whereby the swing of the signal at said input is targeted to be between 1.5 to 5 times larger than the difference between said positive and said negative threshold.

The swing of the signal of the input can be targeted through the use of a feedback loop. The latching circuit is preferably a Schmitt trigger.

Another aspect of the present invention is method for receiving digital data from a preceding signal path, said digital data having a lower to upper data frequency range, where the signal has been attenuated in its higher frequency components in said preceding signal path, comprising the steps of:

Providing a receiver according to the present invention,
Feeding said digital signal to the higher frequency gain circuit of said receiver and providing an amplified signal at an amplified signal output terminal; and
Feeding said amplified signal to the latching circuit of said receiver and providing a digital output signal at the output terminal of the latching circuit.

SHORT DESCRIPTION OF THE DRAWINGS

Exemplary embodiments of the invention and of the use of the invention are shown in the drawings. The drawings are schematic representations of the invention and therefore the dimensions and the relative dimensions do not correspond to actual reductions to practice of the invention.

Figure 6:
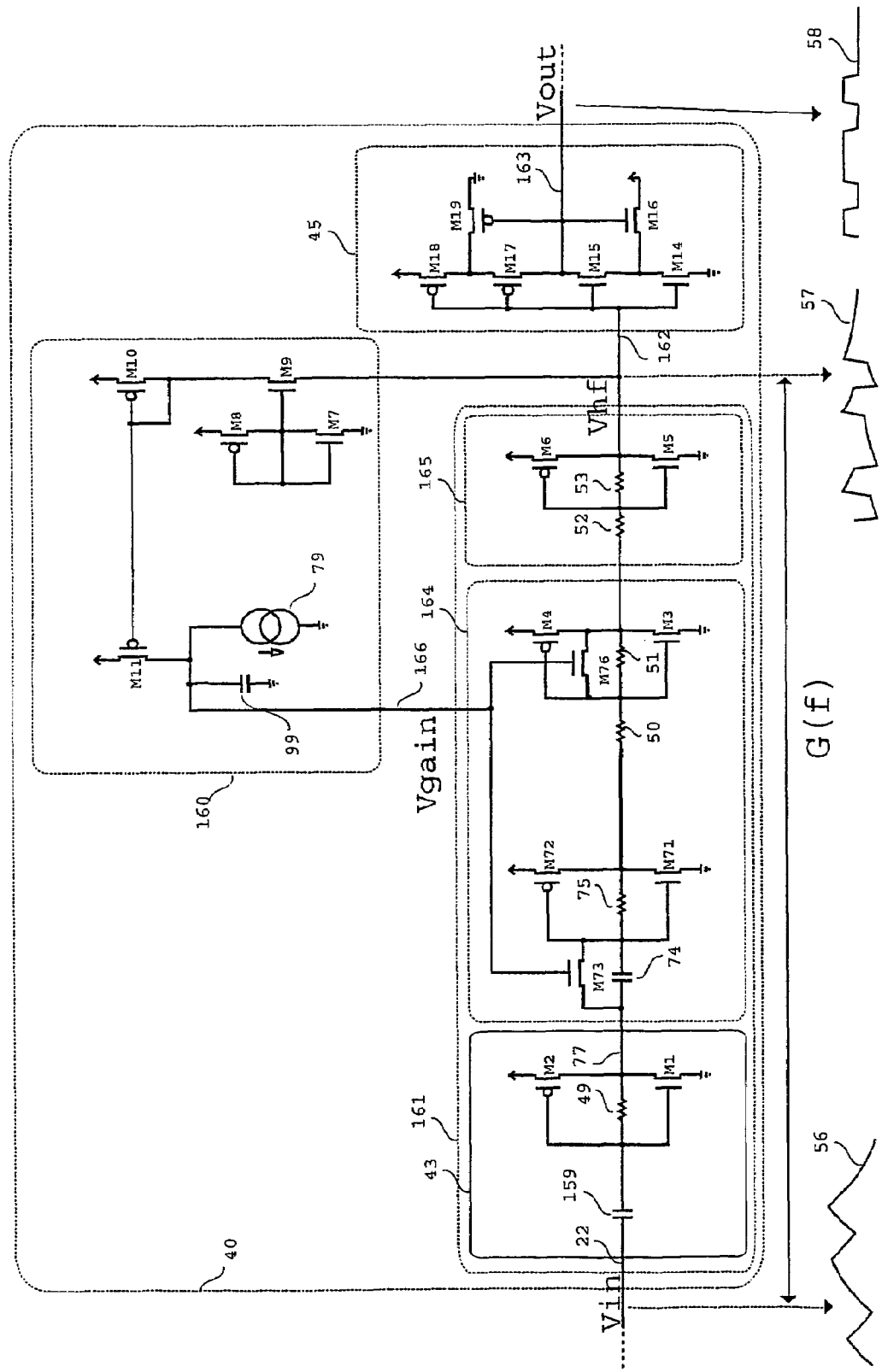
FIG. 6 depicts a preferred embodiment of the present invention that also regulates the strength of the higher frequency gain, including a higher frequency gain block, Schmitt-trigger and an auto-gain circuit.
Figure 7A:
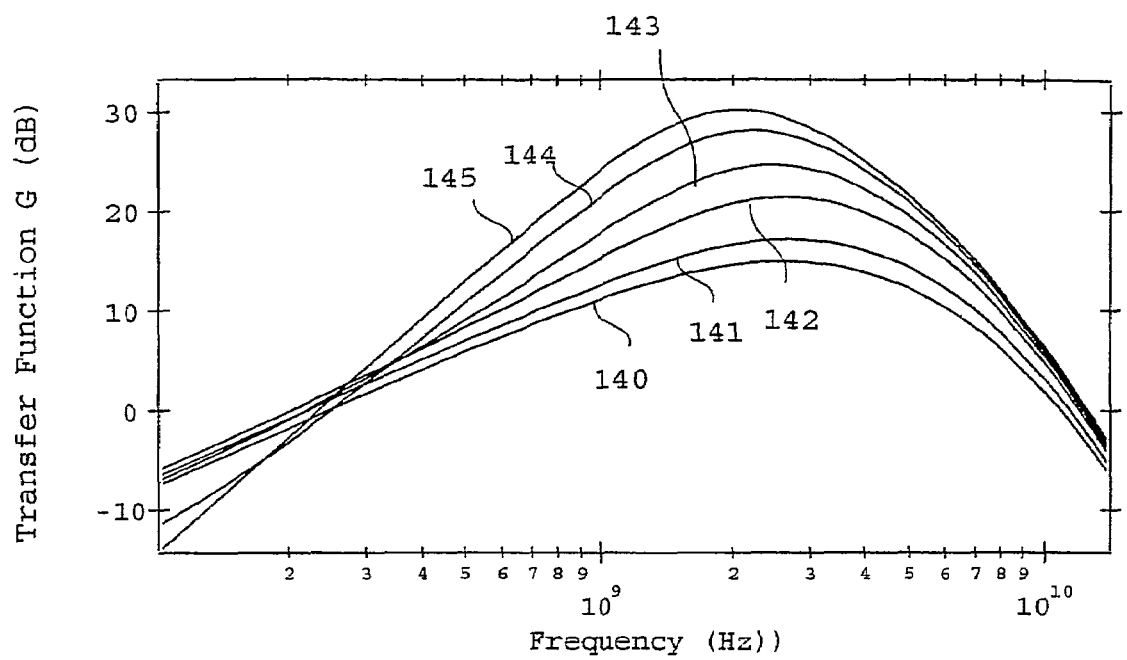
Figure 7B:
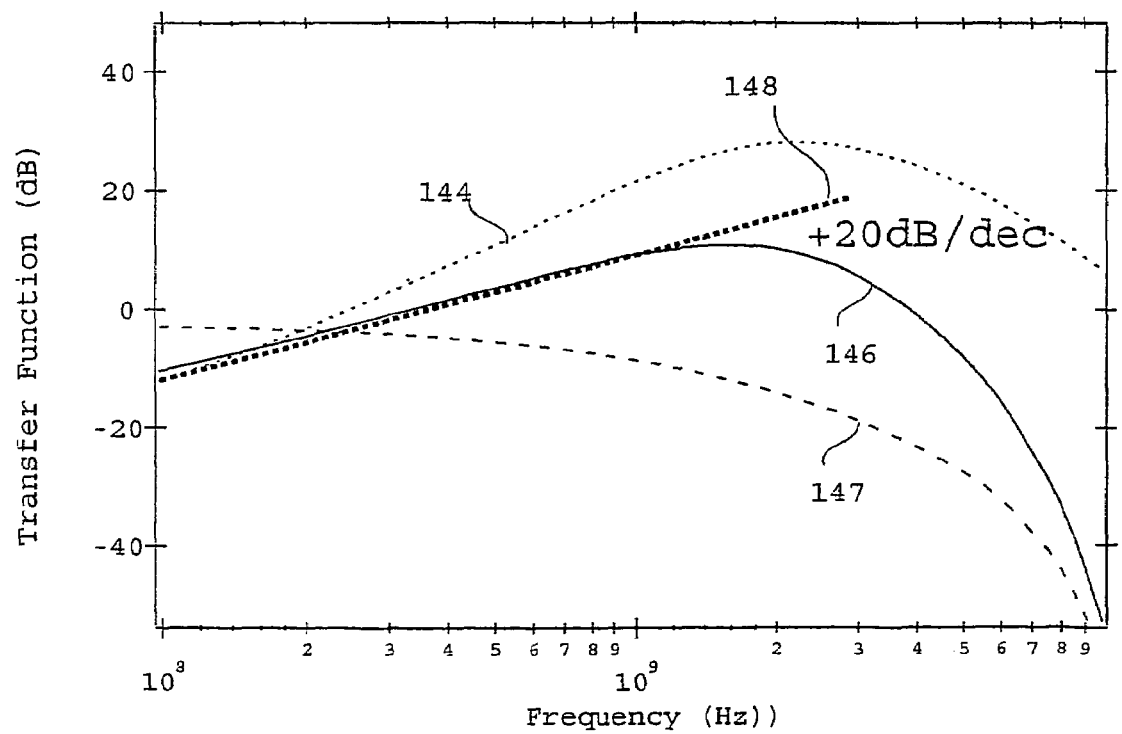

FIG. 7 shows the transfer amplitude of G(f) of the autogain circuit of FIG. 6 for several Vgain voltage values (a). The FIG. 7(b) shows the amplitude of G(f), H(f) and that of the product of H(f).G(f). The slope of 20 dB/dec is reached up to 1.5 GHz.

FIG. 8(a) shows a signal that is attenuated in its preceding path, further being processed by the higher frequency gain block, giving the signal as in (b) at the input of the Schmitt-trigger. At the output of the Schmitt-trigger, the signal as in (c) is obtained.

DETAILED DESCRIPTION OF THE INVENTION

In an electrical interconnect system (FIG. 1 a) possible causes for bandwidth limitation in the preceding path include the line driver 17, the transmission line or coaxial cable 19, and all connectors in the transmission path. Transmission lines and coax cables have several causes for signal attenuation at higher frequencies including skin-effect, radiation and dielectric losses.

In an optical interconnect system (FIG. 1b) possible causes for bandwidth limitation in the preceding path include the light source or modulator 10 and its driver 11, the optical fiber 12, and the detector 13 with its transimpedance amplifier 14,15. A detector 13 in CMOS or BICMOS may show bandwidth limitations due to electron-hole pairs being light generated not only in the depletion zone, but also below the semiconductor junction and its depletion zone.

The slope of attenuation H (62) for the various causes of bandwidth limitation can vary. Skin effect in a cable has typically an attenuation slope versus frequency of −10 dB/decade; a first order bandwidth limiting system has a slope of −20 dB/decade. On the other hand, a short cable can show 0 dB/decade at the frequency of interest.

The embodiments of the present invention include a block with higher frequency gain 59 that has a small signal transfer function G(f) that together with the small signal transfer function H(f) of the preceding path gives rise to a transfer function H(f)×G(f) whereby amplitude 69 at the upper data frequency $F_{ud}$ is substantially equal or stronger present than the components 68 at frequencies below $F_{ud}$, at least down to the lower data frequency $F_{ld}$. The latter design specification is important since it allows conceiving a receiver that recovers data from a signal that has suffered from a variety of bandwidth limitation causes in its preceding path.

Further, the bandwidth $F_{high}$ of the block with higher frequency gain 59 should be at least higher than the upper data frequency $F_{ud}$.

Another element in the embodiments of the present invention is a Schmitt-trigger-like block 45. It has two threshold levels $V_{tp}$ and $V_{tn}$. The signal at the input of this Schmitt-trigger has to be tuned for good functioning of the Schmitt-trigger. There are two tuning requirements: a) the target swing of the input signal to the Schmitt-trigger should be 1.5 to 5 times larger than the difference between the two threshold levels; and b) the average input signal should be positioned essentially halfway between the $V_{tn}$ and the $V_{tp}$ thresholds.

For variable input signals, the use of an auto-gain circuit is disclosed for fulfilling this tuning condition at variable or different circumstances.

It is a further object of the invention to disclose circuit structures to reach digital data recovery efficiently also for differential receivers. Single ended receivers require only one input node 22, whilst differential receivers require two input nodes 120,121 per channel. The effective signal is the difference of the signals on the input pins. Differential receivers are known for being less susceptible by coupled noise, as long as this noise is coupled essentially equally strong to both input nodes, and as such is translated into a common mode signal, not hindering the good operation of the differential receiver. Also in the present invention, differential implementation will allow recovery of more severely crippled data streams.

Further, a last object of the present invention is to disclose a differential receiver that allows very strong and fast variations of the common-mode input signal far outside the input power supply voltage range and possibly faster changing than the differential signals themselves, without generating errors or excessive jitter in the recovered digital data stream, and still featuring the other objects of the invention.

The invention is described in the sequel through a detailed description of several embodiments of the invention. It is obvious that other embodiments of the invention can be configured according to the knowledge of persons skilled in the art without departing form the true spirit of the invention. It will be clear for the person skilled in the art that the present invention is also applicable to the similar circuits that can be configured in any transistor technology, including, CMOS BICMOS and SiGe BICMOS.

Figure 1A:
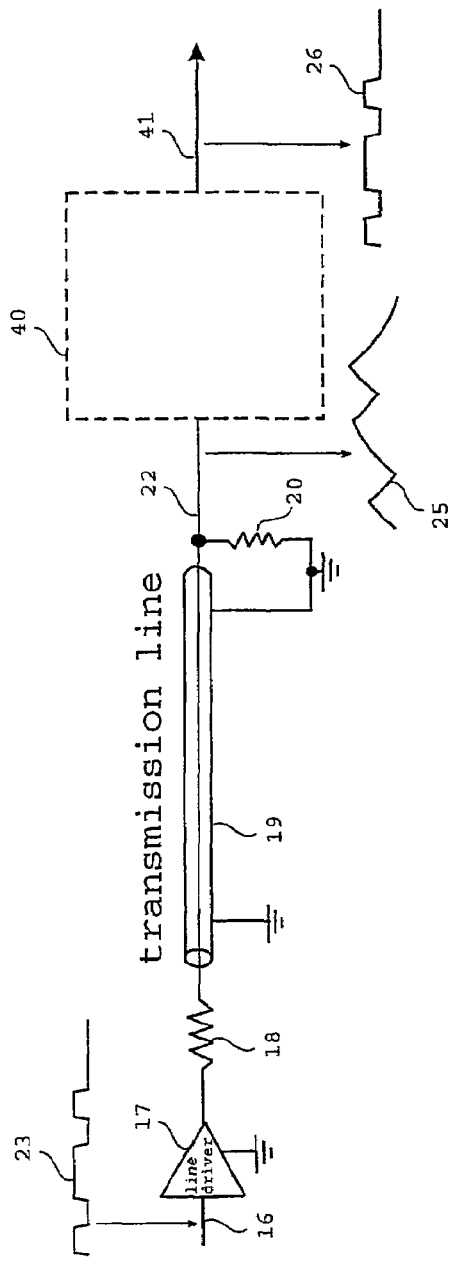
FIG. 1 shows two examples where the receiver of the invention can be used, being part of an electrical interconnect (a) or of an optical interconnect system (b).

FIG. 1 demonstrates two situations where the receiver of the present invention can be used to recover from bandwidth limitations in a digital transmission system. The first example is an electrical interconnects system. Because of signal attenuation in PCB traces, the bandwidth for transmitting digital data is limited. When having a receiver that works beyond the bandwidth limitation, the bit-rate can be improved with a given set-up, or the communication distance can be increased at the given bit rate, or both the bit rate and the communication distance can be increased simultaneously. Consider for example that due to attenuation the length of a PCB trace is limited to 1 meter for reliable data transmission at a given data rate. With the present invention this can be extended to more than 2 meter in a single ended case and more than 4 meters in a differential case.

Figure 1B:
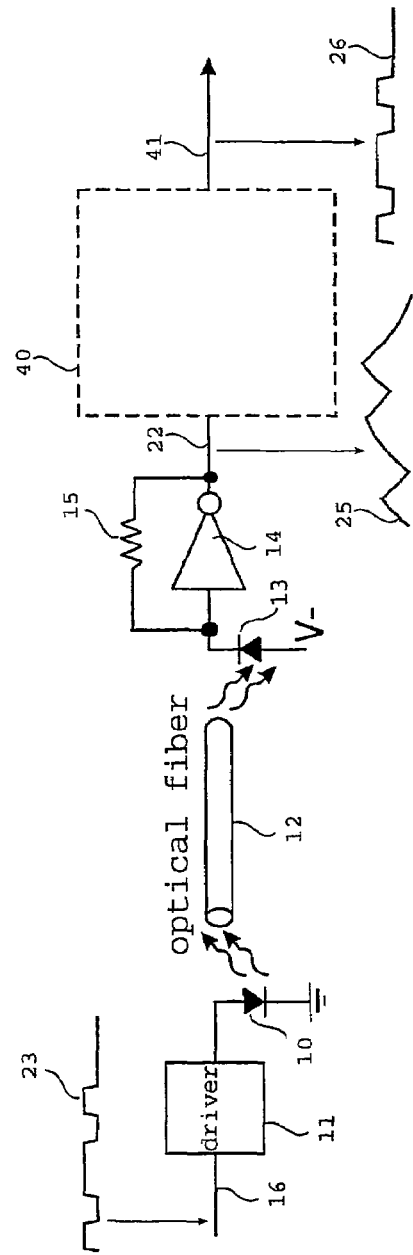

FIG. 1b shows an optical interconnect system with at the end the receiver 40 of the present invention. All parts before receiver 40 that take part in the data transmission can be a cause for too little bandwidth and are part of what is called the preceding path. The signal 25 at node 22 that goes into receiver 40 comes out again at node 41 as signal 26, being essentially the same as data stream 23 that was originally sent, except for some latency that is normal in any communication system.

For the sake of a good understanding, two frequencies have to be defined. The data stream that we want to transmit and receive, determines the first frequency, $F_{ud}$. The shortest pulses present in this data stream have to be recovered. In a regular Non-Return to Zero (NRZ) data stream, these shortest pulses present are as long as a bit time $T_{bit}$. $F_{ud}$ is then defined as $F_{ud}=0.5/T_{bit}$. This upper data frequency $F_{ud}$ is reached with alternating HIGHs and LOWs. Third and higher order harmonic frequencies of $F_{ud}$ are less essential in the present invention. Further, many data formats have a maximum number of consecutive same HIGHs or LOWs. If the maximum number is N, than the lower data frequency is determined by $F_{ld}=F_{ud}/N$. Example given: consider a data rate of 2.5 Gbit/s, with maximum N=10 consecutive same symbols. The bit time $T_{bit}$ is then 400 ps. $F_{ud}$ is then 1.25 GHz (alternating LOW-HIGH-LOW-HIGH etc.), and $F_{ld}$ is then 125 MHz (ten times LOW, ten times HIGH, ten times LOW etc.). If there is no format, and/or if the data can be endless consecutive repetions of only HIGHs or LOWs, then $F_{ld}$ becomes zero.

Figure 3:
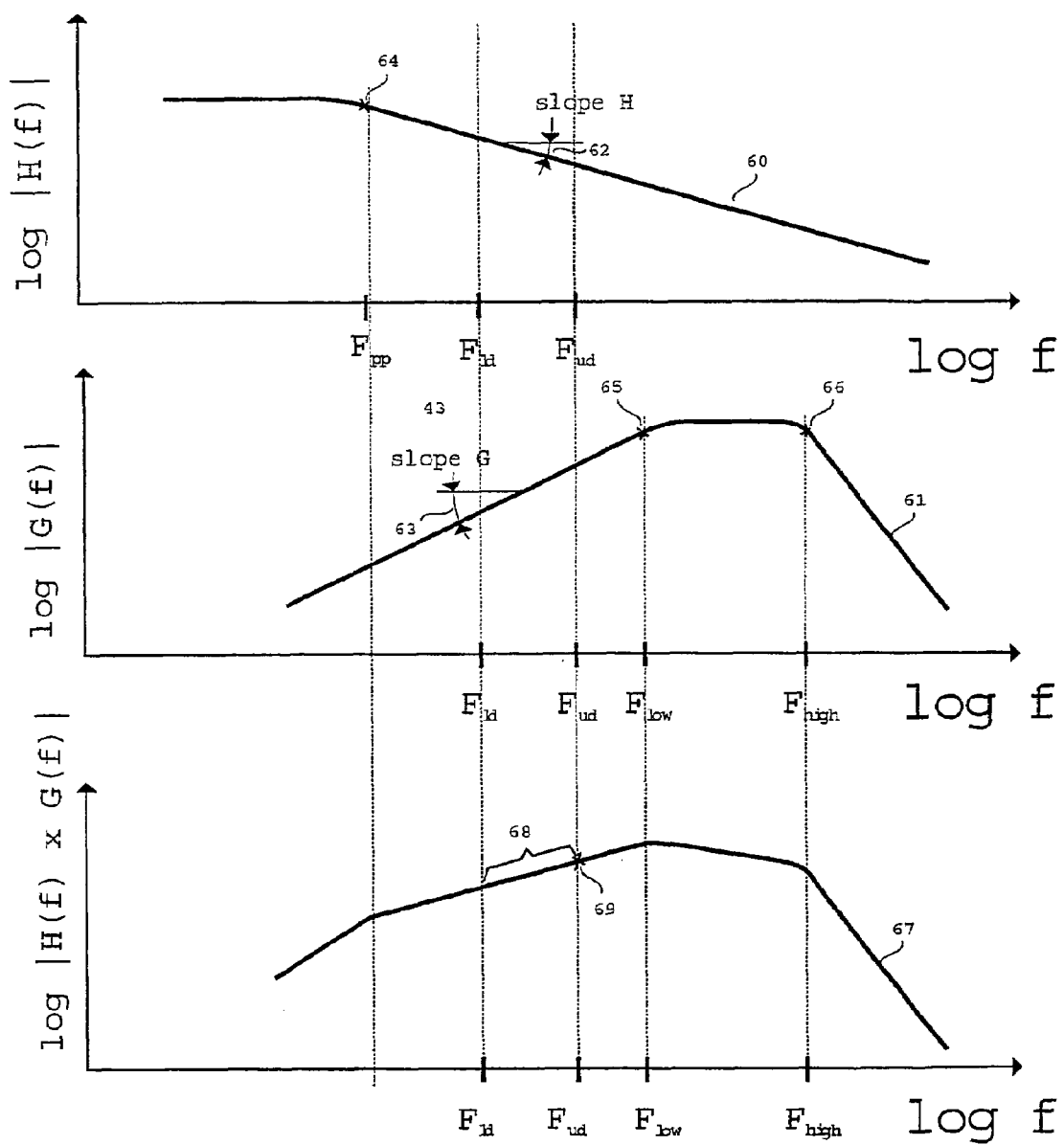
FIG. 3 shows the amplitudes of the small signal frequency responses of the preceding path H(f), of the higher frequency gain block G(f), and that of the product of H(f).G(f)

FIG. 3 shows the frequency dependencies. Curve 60 shows the amplitude of the small signal transfer function H(f) of the preceding path being from node 16 through the communication system up to the input 22 of receiver 40. It is limited in bandwidth at frequency $F_{pp}$ in point 64. $F_{pp}$ and the slope 62 with which curve 60 rolls-off will be depending strongly on the origin for the bandwidth limitation. Slope 62 can also be varying versus frequency or time.

In present day receivers, the preceding path frequency $F_{pp}$ is typically designed to be higher then the upper data frequency $F_{ud}$. However, now we consider $F_{ud}>F_{pp}$. The lower data frequency $F_{ld}$ can be larger or smaller then $F_{pp}$. In FIG. 3, $F_{pp}<F_{ld}$ is chosen as an example.

Figure 2:
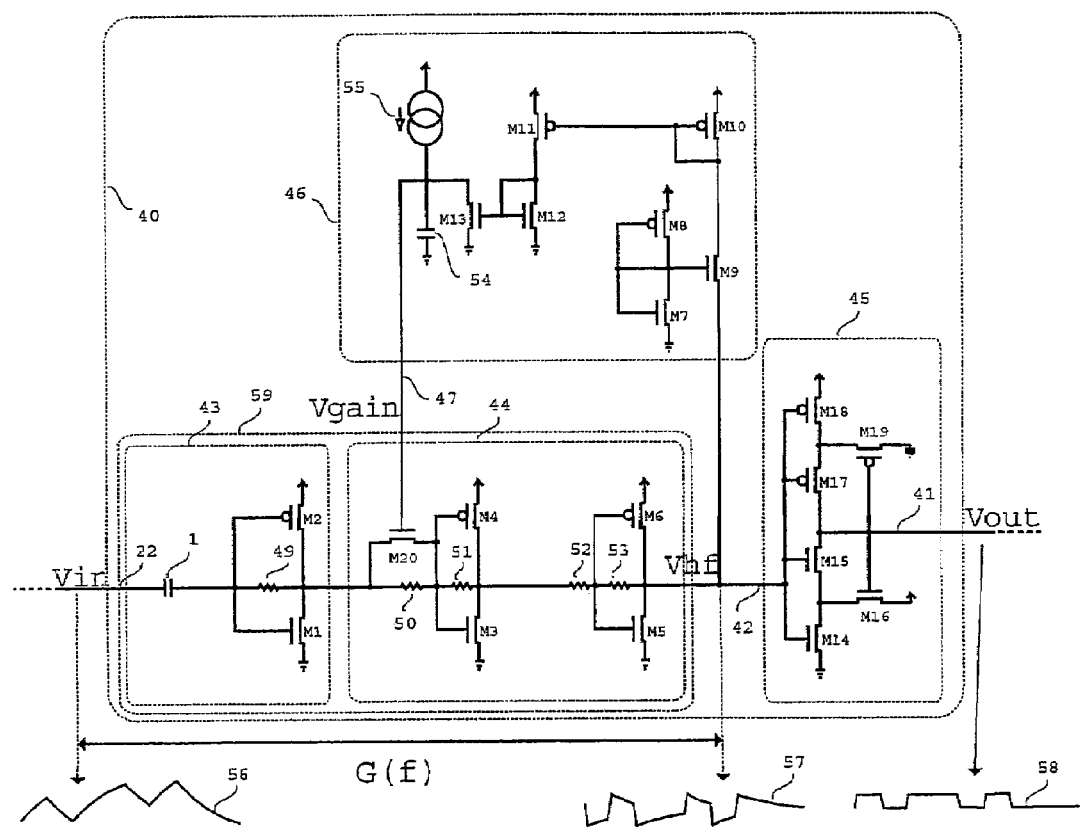
FIG. 2 depicts a preferred embodiment of the present invention including a higher frequency gain block, Schmitt-trigger and an auto-gain circuit.

FIG. 2 shows the preferred embodiment of the receiver of the present invention. Block 59 is a higher frequency gain block, and block 45 represents a Schmitt-trigger or structure with the same function. It is an advisable option to use an automatic gain block 46, for adapting the amplification in block 59 such that it tunes into Schmitt-trigger 45. In FIG. 3, curve 61 represents the amplitude of the small signal transfer function G(f) of the higher frequency gain block 59. It has similarities with a band pass filter, with a positive slope 63 up to point 65 at frequency $F_{low}$, possibly followed by a flat part up to point 66, at frequency $F_{high}$, and a roll-off for the higher frequencies from $F_{high}$ onwards. In particular situations, slope 63 can be depending on the frequency. When $F_{high}$ is close to $F_{low}$, then there is no clear flat part left in the curve 61.

When multiplying the transfer functions H(f) and G(f), and taking the amplitude of the result, curve 67 is obtained. By doing this, we consider the overall transfer function.

Now the requirements to make a good receiver will be discussed. Without looking into practical circuit implementations, necessary requirements can readily be understood. In the data frequency range $F_{ld}$ to $F_{ud}$, curve 67 should be such that the transfer amplitude is substantially (within 3 dB) at its highest level at $F_{ud}$. In that way, the component in the signal with frequency $F_{ud}$ has largest amplitude. This is important, since it is essentially this component in the signal that triggers the Schmitt trigger 45. Curve 67 shows rising amplitude for rising frequency in the data frequency range $F_{ld}$ to $F_{ud}$. The other frequencies like Fud/2, Fud/3 etc. are less important in the steep edges that induce the switching of the subsequent Schmitt trigger 45. However, when curve part 68 of curve 67 is flat, these lower frequencies may cause unwanted jitter when the function H(f)×G(f) is not linear in phase between $F_{ld}$ and $F_{up}$. Having a linear phase is similar to saying that the transit time is frequency independent, a requirement for low jitter. So it can be allowed that part 68 is flat, but in that case linearity in phase is a concern. A designer skilled in the art can adapt G(f) such that this phase linearity can be reached. However, in most cases, it is much easier to design curve part 68 monotonically rising. The frequencies $F_{ud}/2$, $F_{ud}/3$ etc . . . become attenuated, and in that way their influence is minimised and linearity of phase becomes much less a concern.

A second rule that is suggested, but not really required, is that $F_{ud}$ is targeted to be equal to $F_{low}$. When on the contrary, curve 67 would remain rising beyond $F_{ud}$, then higher frequencies in the signal would unnecessarily be amplified. This represents a risk, since there can be several noise sources that generate higher frequencies ripples, like power supply ripples, or cross-talk on the communication lines in the preceding path. Also one would not unnecessarily want to amplify thermal noise sources. From simulations we discovered that as long as $F_{ud}$ is below two-times the frequency $F_{low}$, the receiver works well. In order to have some margin we therefore suggest targeting the frequency $F_{low}$ to fall together with frequency $F_{ud}$.

A third rule is to choose $F_{high}$ at least as high as $F_{ud}$. The lower that $F_{high}$ can be, the lower the power consumption, and the more the unnecessary higher frequency components and noise get attenuated. However, it can be demonstrated that by designing $F_{high}$ lower then $F_{ud}$, that jitter in the digital output stream starts increasing to unwanted levels. It is therefore suggested to choose $F_{high}$ with some margin at $2 \times F_{ud}$, if possible.

Another element in the embodiments of the present invention is Schmitt-trigger 45. It has two threshold levels $V_{tp}$ and $V_{tn}$. When the input voltage at node 22 gets higher than $V_{tp}$, the output goes to the LOW digital state, and when the input voltage decreases below $V_{tn}$, the output goes to the digital HIGH state. Thereby $V_{tp}$ is higher then $V_{tn}$. There are many ways to design a latching structure with two threshold levels that are similar to the Schmitt-trigger, including systems with a latch and two comparators. The designer can select what is best for his purpose. The Schmitt-trigger based on transistors M14 . . . M19 as in FIG. 2 is only provided as an example. The relative W/L values of these transistors determine the position of the levels $V_{tp}$ and $V_{tn}$.

The signal at the input of this Schmitt-trigger must be conditioned for good functioning of the Schmitt-trigger. There are two conditions: a) the swing of the input signal to the Schmitt-trigger should be 1.5 to 5 times larger than the difference between the two threshold levels ($V_{tp}$-$V_{tn}$); and b) the average input signal should be positioned essentially halfway between the $V_{tn}$ and the $V_{tp}$ thresholds ($V_{tp}$+$V_{tn}$)/2. When the latter condition is not met, pulse-width distortion will be obtained, increasing the deterministic jitter in the digital output stream. A slow negative feedback loop with gain can bring the average input signal to the required level, as is known by the person skilled in the art.

Figure 4A:
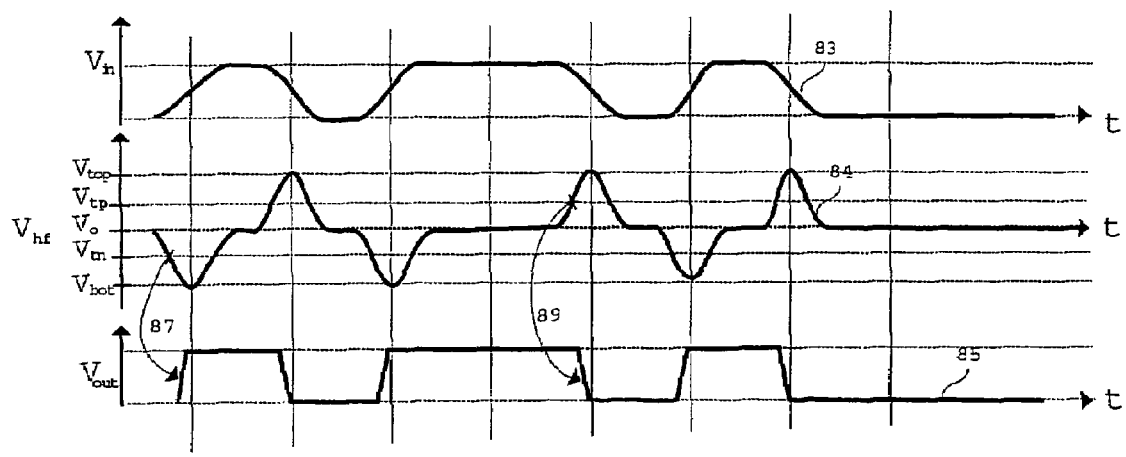
FIG. 4 shows signal evolutions versus time when having signal attenuations in the preceding path of 0 dB/decade (a), −10 dB/decade (b) and −20 dB/decade (c).
Figure 4B:
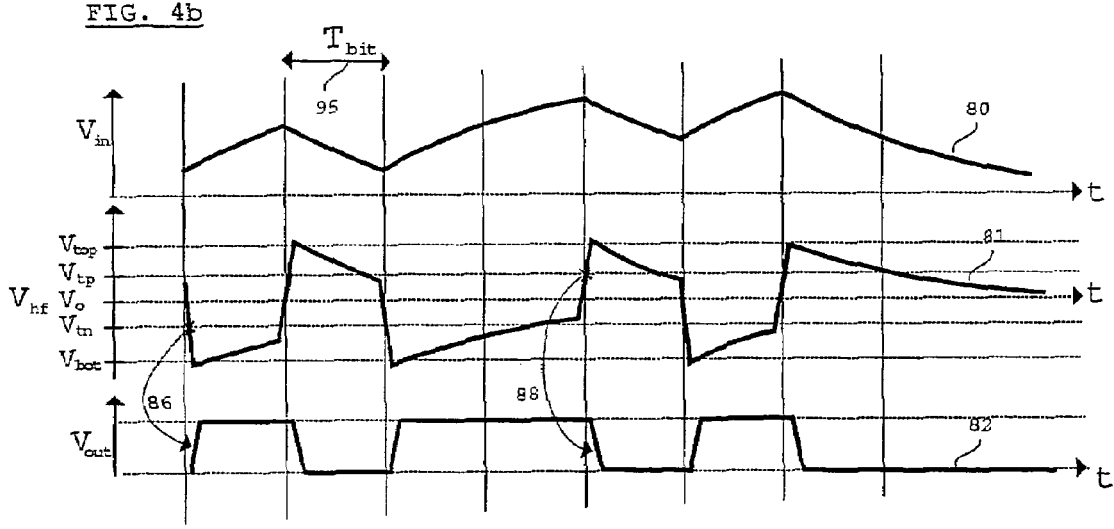
Figure 4C:
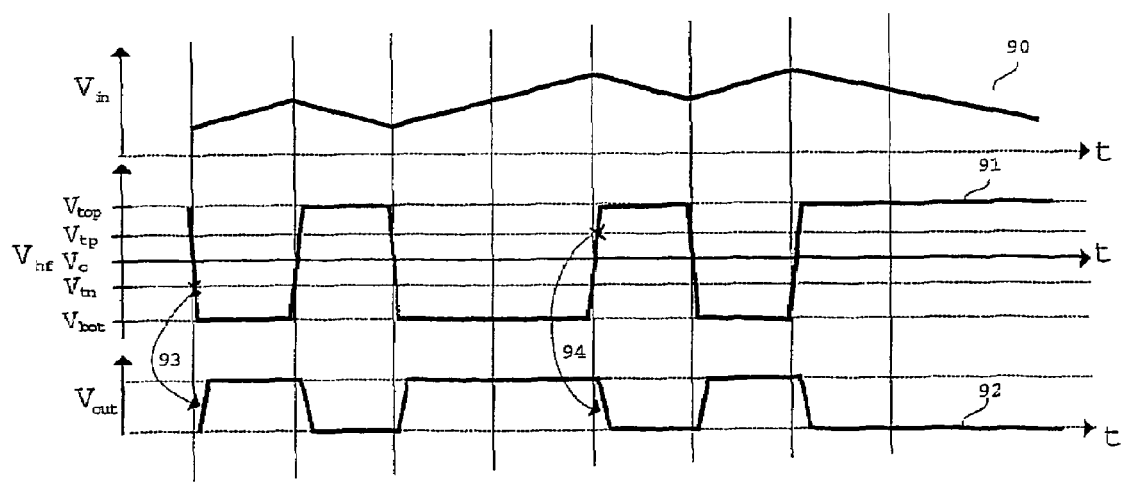

The condition on the swing of the input signal to the Schmitt-trigger is less evident. Curve 80 (FIG. 4b) is a signal versus time whereby the components at $F_{ud}$ became somewhat attenuated during transmission. Curve 80 is used as input signal at the node 22 of receiver 40. After the higher frequency gain block 59, signal curve 81 is obtained at node 42 entering the Schmitt-trigger 45. At the Y-axis of curve 81, $V_{top}$, $V_{tp}$, $V_0$ $V_{tn}$ and $V_{bot}$ are indicated. In principle, all of the tops have almost the same value $V_{top}$. This is similar for the bottom values $V_{bot}$. However, in reality there is a small statistic variation in these top values and therefore it is advised (in order not to miss any edges) to condition the input signal swing ($V_{top}$-$V_{bot}$) to at least 1.5 times the difference ($V_{tp}$-$V_{tn}$). On the other hand increasing the swing too much would unfortunately also increase the unwanted noise (not shown on the curves) to such large extend that false triggering would become likely and generate bit errors. Sources for unwanted noise includes cross-talk and supply voltage variation. We advise to make the swing ($V_{top}$-$V_{bot}$) not more than 5 times the difference ($V_{tp}$-$V_{tn}$). A factor of 2 is an advisable target.

For variable input signals, the use of an auto-gain circuit is disclosed for fulfilling this tuning condition at variable or different circumstances. Block 46 monitors the swing from signal $V_{hf}$ on node 42, and when it is systematically too low, $V_{gain}$, being the voltage on node 47, rises and in that ways increases the gain in the higher-frequency gain block. When the swing is too high, $V_{gain}$ decreases and the gain decreases until the wanted amplitude or swing is obtained on node 42.

The exact implementation of the higher frequency gain block 59 depends on the envisaged application and circuit technology. The version shown in FIG. 2 is an example of a CMOS circuit. Block 43 is a differentiator, based on an inverter amplifier with capacitor 159 as input and resistor 49 as transimpedance element. This results in a slope 63 of function G(-) equal to +20 dB/decade. This differentiator further determines essentially the frequency $F_{low}$. Block 44 is a dual stage amplifier in which the amplifications can be set by the value of the resistors 50 . . . 53. Changing any of these values will change the amplification factor. This can be used for changing the gain in the automatic gain loop. Transistor M20 can in that sense overrule the value of resistor 50 in order to increase the amplification of the first amplifier in block 44. Other ways of changing the amplification factor are known to the person skilled in the art.

A special way to change the curve 61 is by regulating the value of transimpedance resistor 49. This can be obtained for example with an nmos or pmos transistor used in its triode region. In that way, the amplification changes together with the frequency $F_{low}$. This is useful for variable rate receivers. A two times lower data rate has typically rising and falling edges that are two times less steep, giving two times smaller derivative values. By making the value of the resistor 49 two times larger, this decrease is compensated for. And the frequency $F_{low}$, decreases by a factor of two, what is according to the aforementioned design suggestions. Other useful gain regulation principles can be designed according to the designer's knowledge of the use of the receiver. Changing the effective value of more than one of the resistors 49 . . . 53 at the same time is an option to increase the total dynamic range. It is also possible to match the input signal with the Schmitt-trigger levels by changing the $V_{tp}$ and $V_{tn}$ thresholds rather then the input signal swing. It is clear that this is equally possible, but it doesn't show any particular advantage.

The use of a differentiator in the higher frequency gain block 59 with a +20 dB/decade slope has the advantage that it can handle three interesting cases and their intermediate variants without changing the circuit. It can handle a data signal that has not been attenuated (curve 83), one that is attenuated with −10 dB/decade (curve 80), and one that is attenuated by −20 dB/decade (curve 90).

Differentiation of curve 83, by following the aforementioned rules, gives the signal 84 being the voltage $V_{hf}$ at node 42. A rising edge leads to a negative pulse, and a falling edge to a positive pulse. Halfway the negative pulse (87) the Schmitt-trigger changes state to HIGH, and vice-versa halfway the positive pulse (89), the state changes to LOW. The signal at the output of the receiver $V_{out}$ at node 41 is shown versus time in curve 85.

Differentiation of curve 80, gives curve 81 coming out of the higher frequency gain block 59, and is converted to a digital pulse train 82 by the Schmitt-trigger 45 showing a replica of the initial data. Therefore during the negative edge (86) the Schmitt-trigger changes state to HIGH, and during the positive edge (88), the state changes to LOW.

Finally, a signal that has been attenuated by −20 dB/decade like curve 90 will be fully compensated, giving a $V_{hf}$ signal versus time curve 91 that is essentially rectangular. Schmitt-trigger 45 will then essentially pass-through this signal unchanged giving a replica of the initial data in curve 92. Therefore at three quarters of the negative edge (93) the Schmitt-trigger changes state to HIGH, and vice-versa at three quarters of positive edge (94), the state changes to LOW.

When designing a receiver that can handle these different attenuation types in its preceding path, the use of the auto-gain option of the present invention is advised since different edge amplitudes can be expected.

Figure 5A:
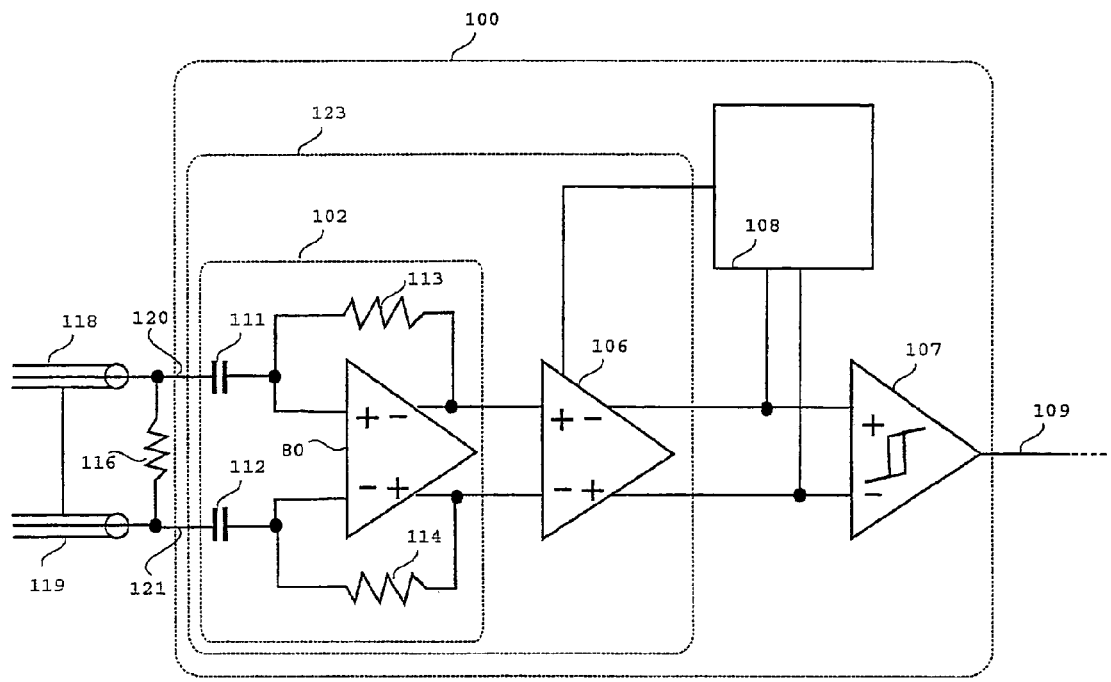
FIG. 5 Shows two embodiments for the differential implementation of the present invention. The lower one (b) can easily withstand very strong common mode fluctuations.
Figure 5B:
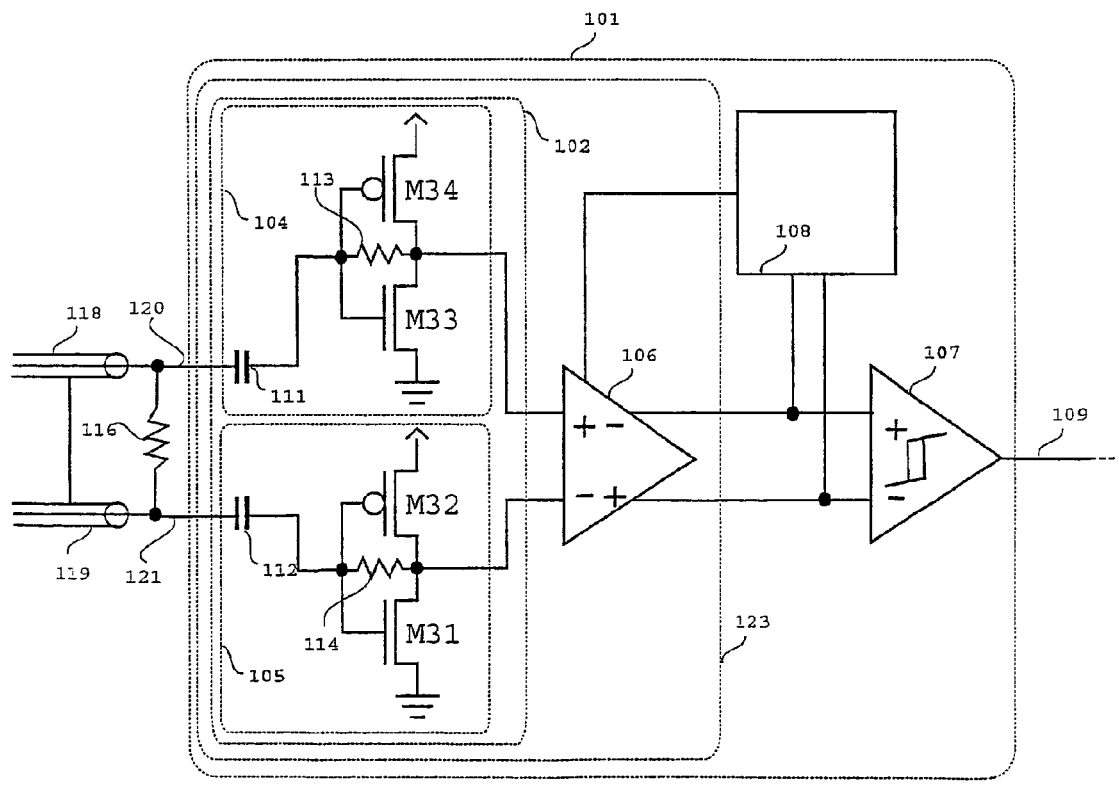

All aforementioned design considerations are applicable to a differential system as well. However, since a large range of electrical receivers is nowadays of the differential type, we discuss some implementation details here explicitly. FIG. 5 shows a differential electrical receiver. Two coax cables 118 and 119 (or a differential transmission line) are terminated at the receiver by impedance 116. Block 123 is the higher frequency gain block, block 108 is the auto-gain option, and block 107 is the differential Schmitt-trigger (of which enough examples can be found in the state of the art). Again, the simplest implementation is to start with a differential differentiator 102, followed by an optional differential amplification stage with optional variable gain. Inside the differentiator 102 is the OTA or Opamp 80. A typical merit of an OTA or Opamp is that it rejects common mode inputs in its transfer to the output. When the common mode variations at the end of the transmission lines are limited, a differential OTA can be of the differential transimpedance amplifier. However, it should be understood that it doesn't reject the common mode at its input, and that the common mode of the input can go beyond the common mode input range of OTA 80, resulting in poor operation. In that case, it is better to have two separate single ended differentiators 104 and 105 that react equally well to common mode as to differential mode variations. The common mode is then still present at the entrance of the amplifier 106, however, at least said possible poor operation is avoided. When amplifier 106 has good common mode rejection ratio, we can get rid of the common mode in this stage as well. Also the final Schmitt-trigger, when operating differentially will serve to reject the common mode. This can result in a system that allows common mode edges that are e.g. 5 times larger or faster then the edges present in the differential data signal. In other words, when envisaging a data stream with 200 mV complementary variations on both inputs with 200 ps edge time, the common mode may vary as fast as 5 V/ns. Capacitors 111 and 112 should be matched capacitors, and preferably be implemented on-chip. A gate capacitor will easily break down already at low voltage across the gate; therefore preference is given to metal insulator metal (MIM) capacitors, with the insulator being the standard inter-metal dielectric of the chip process that allows withstanding many tens of volts per micron dielectric. This can be very much appreciated when linking several devices, with each device having a separate power supply and fluctuations thereon. It further also supports hot insertions of PCB cards, cable connectors and chips. It is strongly advised to implement amplifier 106 and Schmitt-trigger 107 following differential principles, in that way making the receiver much more robust against internal power supply ripples. Also, robustness against process variations of transistor parameters gets improved due to the increased symmetry with which LOW and HIGH digital states are treated and thus pulse-width distortion minimised.

When the receiver is intended to be used at a variable range of circumstances, it is a good practice to design the higher frequency gain circuit in a way that the combined effect of the attenuation of the preceding path together with the higher frequency gain block shows a slope in the combined function |H(f).G(f)| of substantially +20 dB/dec at these variable range of circumstances. This slope is preferably obtained in the total $F_{1d}$ to $F_{ud}$ frequency range; however in most cases it is sufficient to reach this in the frequency range of $F_{ud}/8$ to $F_{ud}$. The penalty for reaching the condition in only a smaller frequency range is the increase of jitter in the recovered digital data stream.

FIG. 6 shows an implementation of a circuit that adaptively matches to a variable length of cable using this design consideration. The receiver is intended for 3 Gbit/s operation. $F_{ud}$ is then 1.5 GHz. FIG. 7, curve 147 shows the attenuation curve for a measured coax-cable. Higher-frequency gain block 161 has four stages: a differentiator 43, a two-stage gain-controlled amplifier 164, and a fixed-gain amplifier 165. The transfer amplitude |G| of block 161 is shown in FIG. 7 for Vgain voltages on node 166 of 2.6V, 2V, 1.5V, 1.3V, 1.15V, and 1V, corresponding to curves 140 . . . 145 respectively.

In the gain-controlled amplifier block 164, the person skilled in the art can recognize two stages that are affected by the Vgain-voltage on node 166. The way it is constructed is understandable by the person skilled in the art, and is designed such that the following comes true: the amount of higher frequency gain at 1.5 GHz increases together with the slopes of the curves 140 . . . 145 at 1.5 GHz. This is consistent with the fact that when a longer cable is chosen, both the attenuation at 1.5 GHz and the slope of the attenuation at 1.5 GHz become stronger. The voltage at Vgain has to decrease in order to have increased amplification at 1.5 GHz.

The feedback-loop is conceived now in such a way that when there is not enough amplitude at node 162,—due to the attenuation H(f) not being sufficiently compensated by G(f)—, the voltage Vgain on node 166, will decrease. Then the gain at 1.5 GHz increases accordingly, together with the slope in the frequency range of 100 MHz to $F_{ud}$ (1.5 GHz). By choosing the amplification in 165 at a fixed value the loop can be designed to converge to the point where the slope 148 of the combined function |H(f).G(f)| 146 reaches +20 dB/dec. The tuning (as explained in earlier paragraphs) into the Schmitt-trigger is hereby still maintained.

FIG. 8 shows the operation in time domain. The signal 151 at the input of the receiver is a measured crippled digital data-stream signal at the output of a coax (of which the attenuation curve 147 was shown in FIG. 7). This signal is used as input for the simulation of the circuit of FIG. 6. Signal 152 is the signal at node 162, being the entrance of the Schmitt-trigger 45. Vgain has converged to 1.15V, selecting thereby curve 144 out of the set of curves 140 . . . 145. The output signal 153 is obtained at the output of the Schmitt-trigger, node 163. Since the +20 dB condition is fulfilled in a large frequency range (from 100 MHz to 1.5 GHz) the recovered digital data-stream is a nice replica of the original data, except for a minor amount of added jitter.

The person skilled in the art can, as previously mentioned, transform any single ended design into a differential or partly differential design, as will be the case for the circuit and the principles taught by the embodiment of FIG. 6.

The invention claimed is:

1. A receiver for digital data for connection to a preceding signal path, said digital data having a lower to upper data frequency range, comprising:
   a received signal input terminal connected to a higher frequency gain circuit that has highest transfer amplitude at said upper data frequency within said lower to upper data frequency range where the signal has been attenuated in its higher frequency components in said preceding signal path and providing an amplified signal at an amplified signal output terminal and wherein the higher frequency gain circuit together with said attenuation in said preceding signal path has a slope in the transfer amplitude of +20 dB/decade at said upper data frequency; and
   a latching circuit with two threshold levels, said latching circuit being connected with an input terminal to said amplified signal output terminal and an output terminal providing a digital output signal.

2. The receiver for digital data as in claim 1, wherein said latching circuit comprises a latch and two comparators.

3. The receiver for digital data as in claim 1, wherein said latching circuit is a Schmitt trigger.

4. The receiver for digital data as in claim 1, said higher frequency gain circuit further having a transfer function with increasing amplitude for increasing frequency in said lower to upper data frequency range and that starts to decrease in amplitude from a frequency that is higher than said upper data frequency.

5. The receiver for digital data as in claim 1, wherein the received signal input terminal is arranged to receive a differential signal between two input nodes.

6. The receiver for digital data as in claim 1, wherein the received signal input terminal comprises one input node arranged to receive the signal.

7. The receiver for digital data as in claim 1, wherein the higher frequency gain circuit has a transfer function that in amplitude remains equal or decreases for increasing frequencies from said upper data frequency onwards.

8. The receiver for digital data as in claim 1, wherein the latching circuit has a positive threshold and a negative threshold.

9. The receiver for digital data as in claim 1, wherein the output of the latching circuit switches from HIGH to LOW when the signal at its input terminal increases above said positive threshold the output switches from LOW to HIGH when the signal at its input terminal decreases below said negative threshold and the swing of said signal at said input terminal is between 1.5 to 5 times larger than the difference between said positive and said negative threshold.

10. The receiver for digital data as in claim 1, further comprising an auto gain circuit that changes an amplification factor in said higher frequency gain circuit in a way that the signal swing at said input of said latching circuit remains substantially at a predefined target value.

11. The receiver for digital data as in claim 1, further comprising a negative feedback loop arranged to bring the average signal at said input terminal of said latching circuit to essentially halfway between said positive and said negative threshold.

12. The receiver for digital data as in claim 1, wherein the higher frequency gain circuit comprises a differentiator stage.

13. The receiver as in claim 12, wherein the higher frequency gain circuit further composes a gain stage.

14. The receiver for digital data as in claim 1, wherein a non-differential signal is received, the higher frequency gain circuit having a capacitor at its input.

15. The receiver for digital data as in claim 1, wherein a differential signal is received, the higher frequency gain circuit having a capacitor connected to each of its two said input nodes.

16. The receiver for digital data as in claim 1 wherein said slope is present in the frequency range between one eighth of said upper data frequency and said upper data frequency itself.

17. A method for receiving digital data from a preceding signal path, said digital data having a lower to upper data frequency range, where the signal has been attenuated in its higher frequency components in said preceding signal path, comprising the steps of:

providing a receiver such as in claim 1, feeding said digital signal to the higher frequency gain circuit of said receiver and providing an amplified signal at an amplified signal output terminal; and feeding said amplified signal to the latching circuit of said receiver and providing a digital output signal at the output terminal of the latching circuit.

* * * * *